United States Patent
Klemen et al.

(10) Patent No.: US 9,561,763 B2
(45) Date of Patent: Feb. 7, 2017

(54) CONTROL SYSTEM FOR A DUAL REDUNDANT MOTOR/GENERATOR AND ENGINE

(71) Applicants: Rolls-Royce North American Technologies, Inc., Indianapolis, IN (US); Rolls-Royce Corporation, Indianapolis, IN (US)

(72) Inventors: Donald Klemen, Carmel, IN (US); Eric E. Wilson, Mooresville, IN (US); Christine A. Ross, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 14/574,891

(22) Filed: Dec. 18, 2014

(65) Prior Publication Data

US 2015/0175101 A1    Jun. 25, 2015

Related U.S. Application Data

(60) Provisional application No. 61/920,330, filed on Dec. 23, 2013.

(51) Int. Cl.
*B60R 16/03* (2006.01)
*H02P 5/60* (2006.01)
(Continued)

(52) U.S. Cl.
CPC .............. *B60R 16/03* (2013.01); *H02J 4/00* (2013.01); *H02P 5/60* (2013.01); *H02P 5/69* (2013.01); *H02P 5/747* (2013.01)

(58) Field of Classification Search
CPC ...................................................... B60R 16/03
(Continued)

(56) References Cited

U.S. PATENT DOCUMENTS

| 4,476,395 | A | * | 10/1984 | Cronin | ............... | H02K 16/00 |
| | | | | | | 290/4 C |
| 6,142,418 | A | * | 11/2000 | Weber | ............... | B64D 41/00 |
| | | | | | | 244/17.19 |

(Continued)

FOREIGN PATENT DOCUMENTS

EP    1740409 B1    6/2010

OTHER PUBLICATIONS

Search Report for EP 14198139.9, mailed May 13, 2015, 3 pp.

*Primary Examiner* — Joseph Waks
(74) *Attorney, Agent, or Firm* — Fishman Stewart PLLC

(57) ABSTRACT

An exemplary electrical system may include a power plant operable to provide motive power, and a first and a second motor/generator operatively coupled to a common gear shaft, and to the power plant via a gearbox and drive shaft. The exemplary electrical system may further include a system controller configured to selectively operate at least one of the first motor/generator and the second motor/generator in one of a motor operating mode and a generator operating mode based on at least one parameter. The at least one parameter may be, but is not limited to, vibration and torque. In the motor operating mode, the first and/or second motor/generator provides power to the power plant. In the generator operating mode, the first and/or the second motor/generator extracts power from the power plant.

20 Claims, 4 Drawing Sheets

(51) Int. Cl.
*H02P 5/69* (2006.01)
*H02P 5/747* (2006.01)
*H02J 4/00* (2006.01)

(58) Field of Classification Search
USPC .......................................................... 290/4 A
See application file for complete search history.

(56) References Cited

U.S. PATENT DOCUMENTS

| | | | |
|---|---|---|---|
| 6,304,002 B1 * | 10/2001 | Dehlsen | F03D 11/02 |
| | | | 290/1 C |
| 6,840,479 B1 | 1/2005 | Przygoda et al. | |
| 7,285,871 B2 | 10/2007 | Derouineau | |
| 7,495,353 B2 * | 2/2009 | Christensen | F02C 7/32 |
| | | | 290/40 C |
| 7,543,439 B2 | 6/2009 | Butt et al. | |
| 7,584,600 B2 | 9/2009 | Klingels | |
| 7,975,465 B2 | 7/2011 | Morris et al. | |
| 7,997,082 B2 | 8/2011 | Beardsley | |
| 8,403,258 B2 | 3/2013 | Arendt et al. | |
| 8,447,441 B2 | 5/2013 | Calvignac et al. | |
| 2006/0174629 A1 | 8/2006 | Michalko | |
| 2007/0240426 A1 | 10/2007 | Wiegman et al. | |
| 2008/0094013 A1 | 4/2008 | Su | |
| 2008/0157594 A1 * | 7/2008 | Peterson | B60L 11/123 |
| | | | 307/10.1 |
| 2008/0265812 A1 * | 10/2008 | Adra | B60L 11/04 |
| | | | 318/375 |
| 2009/0322503 A1 * | 12/2009 | Suzuki | B60K 6/365 |
| | | | 340/438 |
| 2010/0000226 A1 | 1/2010 | Rensch | |
| 2012/0253633 A1 | 10/2012 | Anzawa | |
| 2012/0292437 A1 * | 11/2012 | Garcia | B64C 25/405 |
| | | | 244/58 |
| 2013/0098060 A1 | 4/2013 | Suciu et al. | |
| 2013/0147192 A1 | 6/2013 | Condon et al. | |
| 2013/0184913 A1 | 7/2013 | Sujan et al. | |

* cited by examiner

CONTROL SYSTEM FOR A DUAL REDUNDANT MOTOR/GENERATOR AND ENGINE

CROSS-REFERENCE TO RELATED APPLICATIONS

This application claims priority to U.S. Provisional Patent Application No. 61/920,330, filed Dec. 23, 2013, the contents of which are hereby incorporated in their entirety.

FIELD OF TECHNOLOGY

The present disclosure pertains to a control system for a dual redundant motor/generator assembly and an engine of a vehicle.

BACKGROUND

It has become increasingly desirable to improve the overall system design and operation of gas turbines. In a system having a typical gas turbine engine, electrical power is extracted via an electrical generator to supply electrical power to control systems, actuators, weapons systems, climate control systems, and the like. Electrical storage, such as a battery, is typically provided to operate such systems when the gas turbine engine is not running or to provide power for starting the gas turbine engine. In some systems, the generator may have the dual capabilities of operating as a generator and as a motor to alternatively provide power for the gas turbine engine. In some known gas turbine engines, the gas turbine engine includes a high pressure shaft and a lower pressure shaft, and the electrical generator is coupled to one of the high and low pressure shafts.

However, extraction of power from the gas turbine engine via one of the shafts itself typically does not provide the redundancy required for engines utilized in applications of increasing electrical architecture. In addition, coupling multiple generators on available shaft drives at various available speeds may result in a loss in overall system life, and in particular to the drive components of the engine to which the electrical generator is coupled. Coupling of multiple units at various speeds and locations may also limit system failure mode and effects power rerouting options. As such, it has become increasingly desirable to have redundant systems to ensure backup is available. For example, in military applications, the redundancy is important for return to base or mission completion. Current configurations are designed around existing hardware which limits size, power, and thermal and/or durability capabilities. A well designed redundant system will provide a matching of electrical parameters, cooling systems, and control systems so operation of the essential systems can continue uninterrupted if a problem occurs in any of the above systems.

Overcoming these concerns would be desirable and could save the industry substantial resources. Therefore, there exists a need for an electrical system that incorporates redundant capabilities, among other things.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Figure 1:
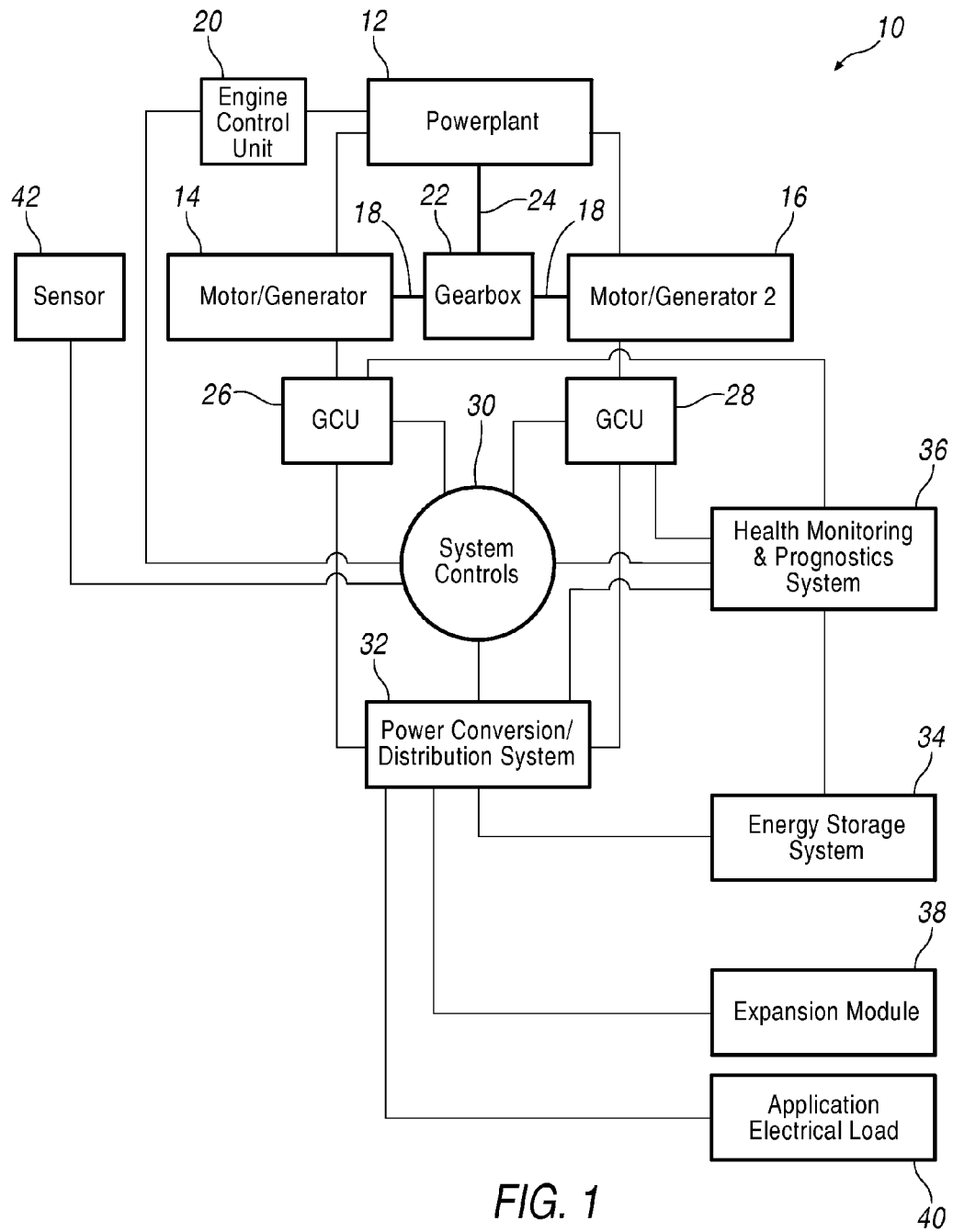
FIG. 1 is a schematic block diagram of an exemplary electrical system having a dual motor/generator assembly coupled to a power plant (or engine)

An electrical system that incorporates at least one dual motor/generator assembly is described herein. Such an electrical system may provide redundant capabilities for the operation of a vehicle, such as an aircraft. An exemplary electrical system may include a power plant, a first motor/generator, and a second motor/generator. Design of the system such that the first and second motor/generator are of common design and architecture is an important feature of the system being described. The first and second motor/generators can also be aligned very precisely which aligns phase and sensors if necessary depending on electrical machine architectures used. This provides by intent, redundant sensors, matched electrical parameters including phase, and, matched cooling systems. For example, in event of a sensor error, the electronics can simply switch to the second sensor without concern of variations. Matching the systems in both phase and voltage will allow transparent switching load units if necessary. In addition, with two motor/generators matched in phase and voltage, the output of both can be supplied to the same electrical bus, advantageous where higher power is requested per bus. Some of these advantages may depend on motor/generator architecture, and the selection of the power electronic systems described herein.

The power plant may be a gas turbine engine, and may be operable to provide motive power. The first motor/generator and the second motor/generator may be operatively coupled to a common gear shaft, and to the power plant via a gear box and a drive shaft. The electrical system may further include a system controller configured to selectively operate at least one of the first motor/generator and the second motor/generator in one of a motor operating mode and a generator operating mode. In the motor operating mode, at least one of the first motor/generator and the second motor/generator provides power to the power plant. In the generator operating mode, at least one of the first motor/generator and the second motor/generator extracts power from the power plant.

An exemplary control system is also described herein, and may include at least one system controller, and at least one sensor in communication with the at least one system controller. The system controller may be configured to selectively operate at least one of the first motor/generator and the second motor/generator in one of the motor operating mode and the generator operating mode based on at least one parameter, as described above. The at least one sensor may be configured to measure the at least one parameter.

An exemplary process is further described herein. The process may include first include operating, by the system controller, the first motor/generator and/or the second motor/generator in the generator operating mode. The process may then include determining if at least one parameter exceeds a predetermined threshold, as described above. If it does, then the process may include transmitting power from an energy storage device to the first motor/generator and/or the second motor/generator. The power may then be transmitted to the power plant and/or to a load. This type of operation may be expected in normal tasks such as starting, or for operability concerns.

Referring now to the Figures, FIG. 1 illustrates an exemplary electrical system 10 for a vehicle, including, but not limited to, an aircraft, in which a power plant or engine 12, such as a gas turbine engine, provides electrical power to be utilized by other components of the vehicle. It should be understood that the electrical system 10 may be an electrical-mechanical system, but for simplicity purposes, is referred to as an electrical system. The engine 12 may be coupled to an engine control unit 20 configured to control the operation of the engine 12, as well as to store and/or monitor various engine parameters including, but not limited to, temperature, vibration, torque, speed, and the like.

Figure 3:
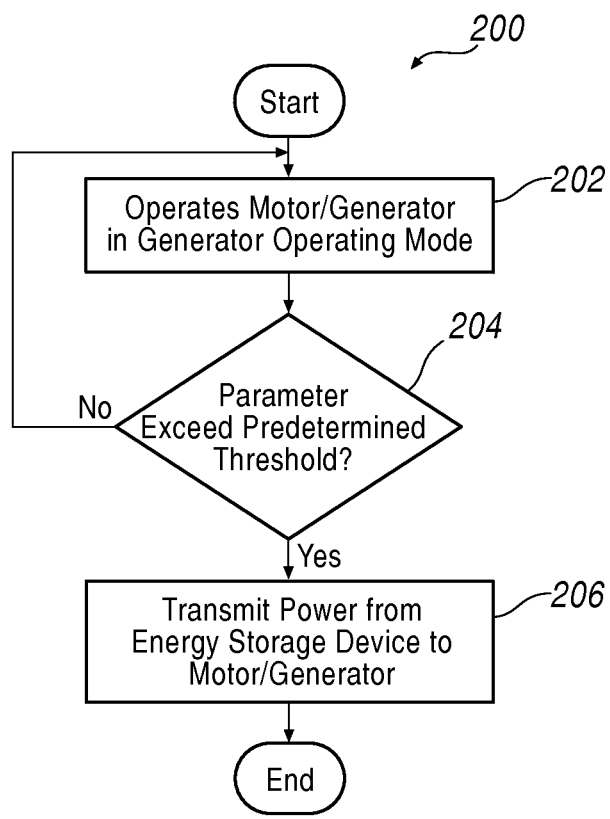
FIG. 3 is a schematic, flow diagram of an exemplary process for controlling the exemplary electrical system of FIG. 1.

In addition to the engine 12, the electrical system 10 also may include a first motor/generator 14 and a second motor/generator 16 coupled to a common gear shaft 18. The first motor/generator 14 and the second motor/generator are also operatively coupled to the engine 12 via a gearbox 22. The gearbox 22 may enable at least one of the first motor/generator 14 and the second motor/generator 16 to operate with the engine 12, as depicted in FIG. 3 and described hereinafter. The first motor/generator 14 and the second motor/generator 16 may each selectively operate as either a motor, where they provide power to the engine 12, or as a generator, where they extract power from the engine 12. The first motor/generator 14 and the second motor/generator 16 may be substantially identical. For example, they may be mechanically timed such that the phase, voltage, and/or harmonics are substantially synchronized.

The use of substantially identical motor/generators 14 and 16 may provide several advantages. These advantages may include, but are not limited to, redundant capability, multiple start capability, and improved cold start capability of the electrical system 10. Further advantages may include reducing mounting loads on the gearbox 22 as there may be balanced masses, reducing internal component loads (e.g., gears, bearings) of accessory pads (not shown), and reducing system weight due to simplified system cooling and connections. In addition, matching phase and voltage allows the output to be supplied to a common electrical distribution bus within the vehicle.

To operatively couple the first motor/generator 14 and the second motor/generator 16 to the engine 12, the gearbox 22 may include a gear shaft 18 to which the first motor/generator 14 and the second motor/generator 16 are coupled, and the gearbox 22 may be configured such that either the first motor/generator 14 or the second motor/generator 16 may be operating at a given time, where the non-operating motor/generator 14 or 16 serves as a backup to provide redundancy. Alternatively, the first motor/generator 14 and the second motor/generator 16 may operate simultaneously at part loads. The gear shaft 18 may be a bevel gear shaft such that rotational energy may be translated between the first and/or the second motor/generators 14 and 16 and the engine 12.

The first motor/generator 14 and the second motor/generator 16 also may be coupled to a first Generator Control Unit (GCU) 26 and a second GCU 28, respectively. The first GCU 26 and the second GCU 28 may be configured to communicate with other system components to ultimately control the operation of the first motor/generator 14 and the second motor/generator 16, respectively.

The electrical system 10 further may include a system controller 30 to which the engine control unit 20, the first GCU 26, and the second GCU 28 are connected. The system controller 30 may be configured to regulate power flow (such as electrical currents and voltages within system 10) to provide power to various electrical busses. The power may be DC, AC, or conversion therebetween. The system controller 30 may also be configured to execute computer program instructions to control the operation of the engine 12, including, but not limited to, fuel flow, the position of any variable geometry systems (e.g., from the flight control system of an aircraft or from a steering system of a ship), and the like, as well as the first motor/generator 14 and the second motor/generator 16, including, but not limited to, the mode of operation, as described in more detail below.

The electrical system 10 may further include a power conversion/distribution system 32 and a health monitoring and prognostics system 36 each coupled to the first GCU 26, the second GCU 28, and/or the system controller 30. The health monitoring and prognostics system 36 generally may be a unit that monitors the health of system components, and may be used to estimate component life based on sensor feedback received from components within the engine 12 and/or the motor generators 14 and 16.

The power conversion/distribution system 32 may be configured to receive electrical power from the first motor/generator 14 and/or the second motor/generator 16 via the first GCU 26 and the second GCU 28, respectively. The power conversion/distribution system 28 may be configured to convert the power to a more useable form such as a DC voltage for storage in an energy storage system 34, an expansion module 38, and/or an application electrical load(s) 40. The energy storage system 34 may include, but is not limited to, a battery or other energy storage system. The energy storage system 34 may be configured to store energy for providing power when the engine 12 is not running (i.e., not generating power), but also to provide power to the first motor/generator 14 and/or the second motor/generator 16 to provide starting power to the engine 12 during startup. The expansion module 38 and the application electrical load 40 represent additional electrical components, which may be standard and/or essential loads, that may receive power from the power conversion/distribution system 32.

The electrical system 10 may further include a sensor 42 in communication with the system controller 30. The sensor 42 may be configured to measure and/or monitor various parameters, including, but not limited to, ambient temperature, generator temperature, oil temperature, engine speed, torque, vibration, and the like. As such, the sensor 42 may be connected to, attached to, or disposed within any one of the system components. While FIG. 1 depicts the electrical system 10 as having only one sensor, it should be appreciated that there may be any number of sensors 42 configured to measure various parameters and being located in various locations within the electrical system 10.

The system controller 30 generally may also be configured to operate the first motor/generator 14 and/or the second motor/generator in a motor operating mode and a generator operating mode based on at least one parameter. In the motor operating mode, the first motor/generator 14 and/or the second motor/generator 16 provides power to the engine 12, as described above. In the generator operating mode, the first motor/generator 14 and/or the second motor/generator 16 extracts power from the engine 12. The at least one parameter may include, but is not limited to, vibration of the engine 12, the first motor/generator 14, and/or the second motor/generator 16, the torque generated by the engine 12, the temperature of the engine 12, the first motor/generator 14, the second motor/generator 16, and the like.

When the at least one parameter exceeds a predetermined threshold, the system controller 30 may be configured to alter the operation of the first motor/generator 14 and/or the second motor/generator 16. For example, where the parameter is vibration and/or torque, and when the vibration and/or torque are such that the system controller 30 begins to see transients and/or the engine 12 approaches a surge condition, the system controller 30 may command the energy storage device 34 to transmit power to the first motor/generator 14 and/or the second motor/generator 16. This additional energy may be used to dampen out the excessive oscillations.

In another example, when the system controller 30 may detect low operating speed of the engine 12, the system controller 30 may command the first motor/generator 14 and/or the second motor/generator 16 to operate in the motor operating mode to supplement the power to the engine 12 such that it continues running.

The system controller 30 may further control any one of the first motor/generator 14, the second motor/generator 16, and the energy storage device to provide power to the expansion module 38 and/or the application electrical load 40, depending upon the requirements of the engine 12.

The system controller 30 may also be configured to redistribute power from one of the first motor/generator 14 and the second motor/generator 16 to the other if it determines that one of the parameters exceeds a predetermined threshold. For example, if only one of the motor/generators 14 or 16 is operating, but the temperature exceeds a predetermined threshold, then the system controller 30 may command both motor/generators 14 and 16 to operate at part load, or alternatively, for the other of the motor/generators 14 or 16 to operate.

Computing devices, including, but not limited to, the system controller 30, the first GCU 26, and the second GCU 28, generally include computer-executable instructions such as the instructions of the system controller 30, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
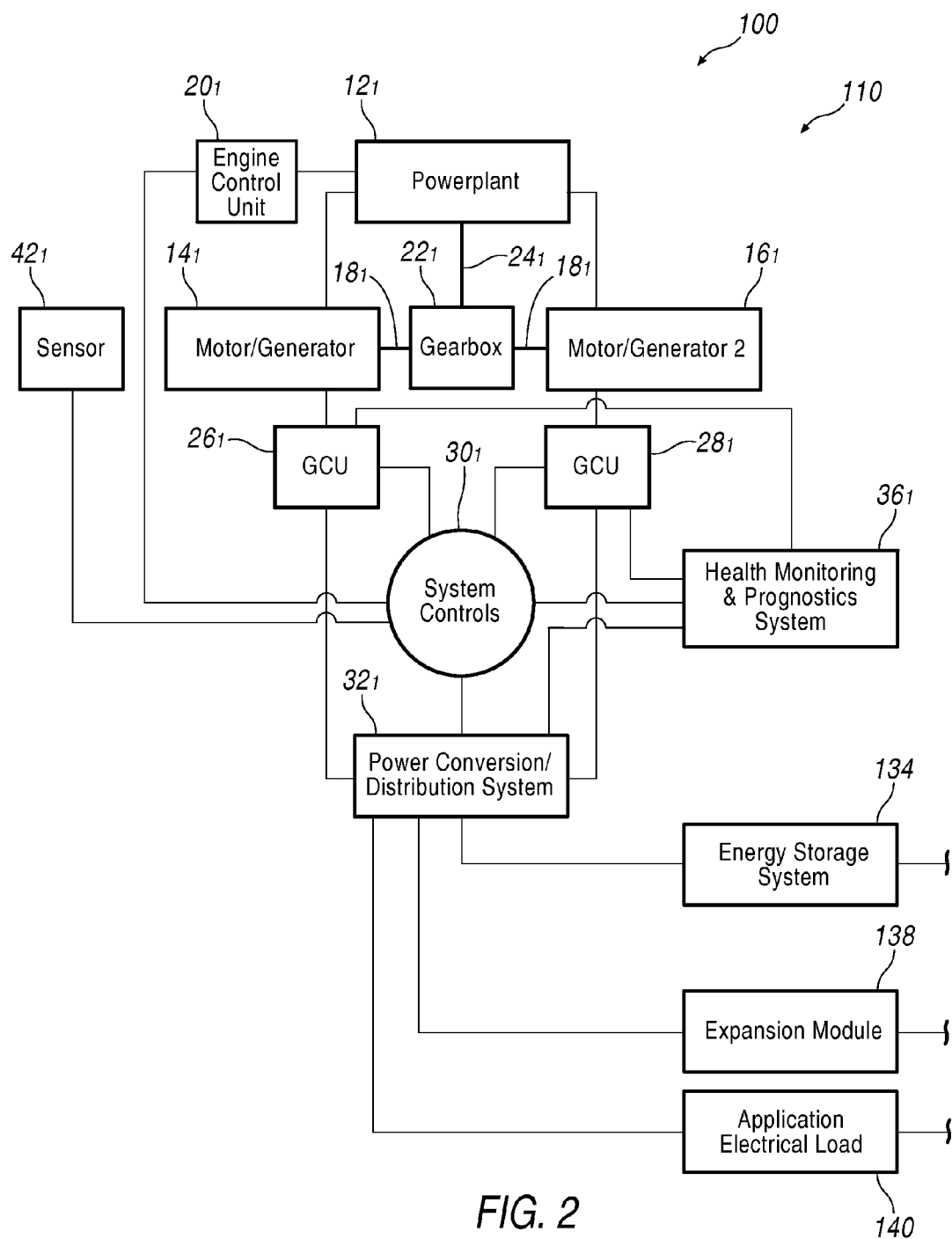
FIG. 2 is a schematic block diagram of another exemplary electrical system having multiple dual motor/generator assemblies each coupled to respective power plants.
Figure 2:
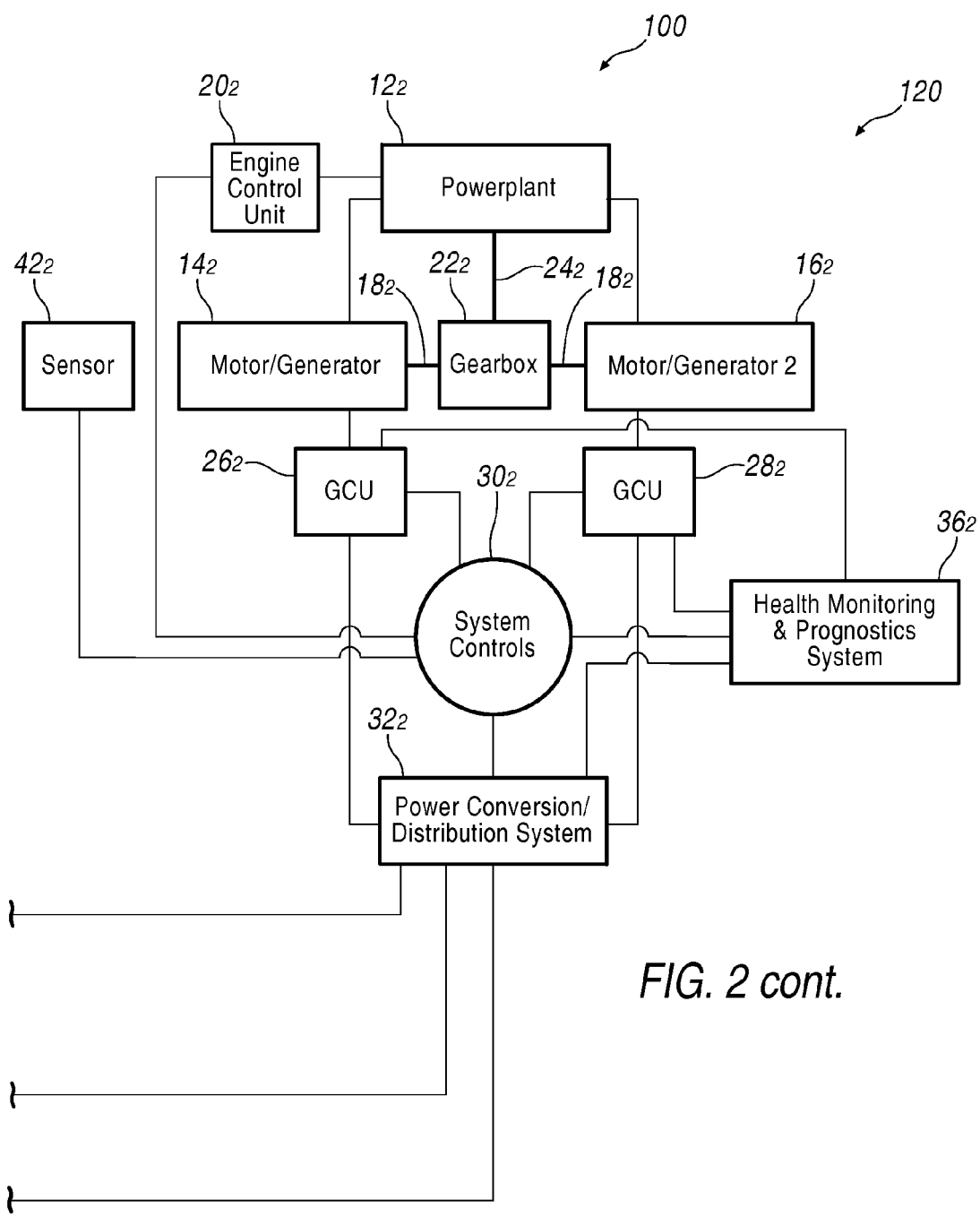

Referring now to FIG. 2, another exemplary electrical system 100 is shown. The electrical system 100 generally may include at least two sub-systems 110 and 120 that each connects to an energy storage system 134, an expansion module 138, and an application load 140. Each sub-system 110 and 120 generally may incorporate the same components and connections as the electrical system 10 depicted in FIG. 1 and described above. The common connection to the energy storage system 134, the expansion module 138, and/or the application electrical load 140 may allow for either sub-system 110 or 120 to power the engine 12 of the other sub-system 120 in such situations as a stalled engine due to failure of any sub-system component, as well as to any other components that require power, such as the expansion module 138 and/or the application electrical load. For example, where the second sub-system 120 may lack sufficient power to run the engine 12$_2$, the sub-system 110 may provide supplemental power to the energy storage system 134. The sub-system 120 may then draw power from the energy storage system 134 to at least one of the generator/motors 14$_2$ and 16$_2$ to provide power to start up the engine 12$_2$.

Referring now to FIG. 3, an exemplary process 200 for controlling the electrical system 10 is shown. At block 202, process 200 may first include operating, by the system controller 30, the first motor/generator 14 and/or the second motor/generator 16 in the generator operating mode. At block 204, process 200 may then include determining if at least one parameter exceeds a predetermined threshold, as described above. If it does, then process 200 may proceed to block 206. If it does not, then the first motor/generator 14 and/or the second motor/generator 16 may continue to operate in the generator operating mode. At block 206, process 200 may then include transmitting power from the energy storage device 34 to the first motor/generator 14 and/or the second motor/generator 16. The power may then be transmitted to the engine 12 such that it continues to operate, and/or to the expansion module 38 and/or the application electrical load 40. Process 200 may end after block 206.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An electrical system comprising:
   a power plant operable to provide motive power;
   a first motor/generator and a second motor/generator operatively coupled to a common gear shaft, and to the power plant via a gearbox and drive shaft; and
   a system controller configured to selectively operate at least one of the first motor/generator and the second motor/generator in one of a motor operating mode and a generator operating mode based on at least one parameter, and to alter the operating mode when the at least one parameter exceeds a predetermined threshold;
   wherein at least one of the first motor/generator and the second motor/generator provides power to the power plant in the motor operating mode, and extracts power from the power plant in the generator operating mode;
   wherein the at least one parameter includes a temperature of at least one of the first motor/generator and the second motor/generator.

2. The electrical system of claim 1, further comprising at least one sensor in communication with the system controller, the at least one sensor being able to measure the at least one parameter.

3. The electrical system of claim 1, further comprising an energy storage system configured to receive power from at least one of the first motor/generator and the second motor/generator, and to transmit power to at least one of the first motor/generator, the second motor/generator, and at least one load.

4. The electrical system of claim 3, wherein the at least one parameter further includes at least one of vibration of at least one of the power plant, the first motor/generator, and the second motor/generator, and torque generated by the power plant.

5. The electrical system of claim 4, wherein the system controller is further configured to transmit power from the energy storage system to at least one of the first motor/generator and the second motor/generator when at least one of the vibration and the torque exceeds a predetermined threshold.

6. The electrical system of claim 5, wherein the system controller is further configured to transmit power from one of the first motor/generator and the second motor/generator to the power plant, and from the other of the first motor/generator and the second motor/generator to the at least one load.

7. The electrical system of claim 5, wherein the system controller is further configured to transmit power from both the first motor/generator and the second motor/generator to the power plant, and from the energy storage device to the at least one load.

8. The electrical system of claim 1, wherein the at least one parameter further includes a temperature of the power plant.

9. The electrical system of claim 1, wherein the system controller is further configured to redistribute power from one of the first motor/generator and the second motor/generator to the other of the first motor/generator and the second motor/generator when the one of the first motor/generator and the second motor/generator has a temperature that exceeds a predetermined threshold.

10. A control system for operating a power plant coupled to a first motor/generator and a second motor/generator, the control system comprising:
    at least one system controller configured to selectively operate at least one of the first motor/generator and the second motor/generator in one of a motor operating mode and a generator operating mode based on at least one parameter, and to alter the operating mode when the at least one parameter exceeds a predetermined threshold; and
    at least one sensor in communication with the at least one system controller, the at least one sensor being able to measure the at least one parameter;
    wherein at least one of the first motor/generator and the second motor/generator provides power to the power plant in the motor operating mode, and extracts power from the power plant in the generator operating mode;
    wherein the at least one parameter includes a temperature of at least one of the first motor/generator and the second motor/generator.

11. The control system of claim 10, further comprising at least one sensor in communication with the system controller, the at least one sensor being able to measure the at least one parameter.

12. The control system of claim 10, further comprising an energy storage system configured to receive power from at least one of the first motor/generator and the second motor/generator, and to transmit power to at least one of the first motor/generator, the second motor/generator, and at least one load.

13. The control system of claim 12, wherein the at least one parameter further includes at least one of vibration of at least one of the power plant, the first motor/generator, and the second motor/generator, and torque generated by the power plant.

14. The control system of claim 13, wherein the system controller is further configured to transmit power from the energy storage system to at least one of the first motor/generator and the second motor/generator when at least one of the vibration and the torque exceeds a predetermined threshold.

15. The control system of claim 14, wherein the system controller is further configured to transmit power from one of the first motor/generator and the second motor/generator to the power plant, and from the other of the first motor/generator and the second motor/generator to the at least one load.

16. The control system of claim 14, wherein the system controller is further configured to transmit power from both the first motor/generator and the second motor/generator to the power plant, and from the energy storage device to the at least one load.

17. A process comprising:
operating, by at least one system controller at least one of a first motor/generator and a second motor/generator in a generator operating mode in which the at least one of a first motor/generator and a second motor/generator extracts power from a power plant;
determining, by the at least one system controller, if at least one parameter exceeds a predetermined threshold; and
if the at least one parameter exceeds the predetermined threshold, then altering from one of the generating operating mode and the motor operating mode to the other of the generating operating mode and the motor operating mode;
wherein the at least one parameter includes a temperature of at least one of the first motor/generator and the second motor/generator.

18. The process of claim 17, further comprising measuring, by at least one sensor, the at least one parameter, and transmitting the measurement to the at least one system controller prior to determining if the at least one parameter exceeds the predetermined threshold.

19. The process of claim 17, further comprising transmitting, by the system controller, transmitting power from one of the first motor/generator and the second motor/generator to the power plant, and from the other of the first motor/generator and the second motor/generator to the at least one load.

20. The process of claim 17, wherein the system controller is further configured to transmit power from both the first motor/generator and the second motor/generator to the power plant, and from the energy storage device to the at least one load.

* * * * *